ively relates to organic silicon compounds and more particularly provides certain new and valuable disilaalkanes and the method of preparing the same. The invention also provides functional fluid compositions comprising the new compounds, and methods of actuating a power-transmitting device wherein said compositions are employed.

United States Patent Office 3,296,297
Patented Jan. 3, 1967

3,296,297
ORGANIC SILICON COMPOUNDS
James A. Webster, Dayton, Ohio, assignor to Monsanto Research Corporation, St. Louis, Mo., a corporation of Delaware
No Drawing. Filed June 13, 1963, Ser. No. 287,473
14 Claims. (Cl. 260—448.2)

This invention relates to organic silicon compounds and more particularly provides certain new and valuable disilaalkanes and the method of preparing the same. The invention also provides functional fluid compositions comprising the new compounds, and methods of actuating a power-transmitting device wherein said compositions are employed.

The new compounds have the formula

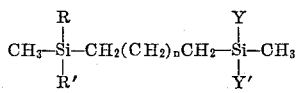

wherein R and Y are selected from the class consisting of methyl and hydrocarbon monocyclic aryl which is free of olefinic and acetylenic unsaturation, contains from 6 to 12 carbon atoms and is linked to silicon through aromatic, nuclear carbon, and R' and Y' are selected from the class consisting of aryl and aryloxyaryl wherein aryl is hydrocarbon and monocyclic, is free of olefinic and acetylenic unsaturation, contains from 6 to 12 carbon atoms and is linked to silicon through aromatic nuclear carbon, and wherein the sum of the total number of carbon atoms in R, R', Y and Y' is from 14 to 28 and $n$ is a number of from 3 to 6.

According to the invention, the presently provided disilaalkanes are prepared, for example, by reaction of an appropriate halogen-substituted disilaalkane with a Grignard reagent, i.e., an appropriate halohydrocarbonmagnesium and/or an appropriate halo-(aryloxyaryl)-magnesium, substantially according to the following scheme when, e.g., each of R, R', Y and Y' of the above formula are phenyl:

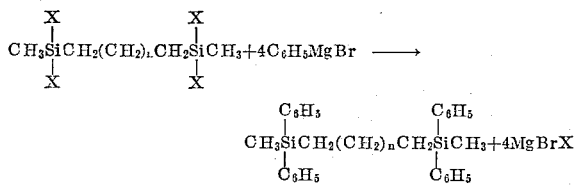

wherein X is halogen having an atomic weight of above 35, and $C_6H_5$ denotes phenyl.

The halogen of the halosilaalkane reactant may be substituted with diverse radicals by reaction with first a quantity of halohydrocarbonmagnesium which is insufficient for replacement of all the silicon-bound halogen, and subsequent reaction or reactions of the partially substituted halodisilaalkane with one or more different halohydrocarbonmagnesium compounds. Operating in this manner a variety of substitutions are obtainable. Thus, to prepare a compound in which each of R and R' is different, 2,2,8,8-dibromo-2,8-disilanonane is first reacted with a molar equivalent of bromophenylmagnesium to give 2-phenyl-2,8,8-tribromo-2,8-disilanonane, the latter is condensed with 1 molar equivalent of bromo-p-tolylmagnesium to give 2-phenyl-8-p-tolyl-2,8-dibromo-2,8-disilanonane, which is then condensed with 2 molar equivalents of bromomethylmagnesium to give 2-methyl-2-phenyl-8-methyl-8-p-tolyl-2,8-disilanonane. Since the aryl radical does not replace two halogens on the same silicon as readily as does methyl, when two moles of the aryl Grignard reagent are employed, one aryl group replaces halogen on each silicon. If it is desired to prepare a compound in which not only R and R', but also Y and Y' are different, then instead of using two molar equivalents of the bromohydrocarbonmagnesium reactant in said last step, there is used one mole each of two different reactants.

The tetrahalodisilaalkanes which serve as starting materials for preparation of the present aryl disilaalkanes are readily available by the reaction of the dienic hydrocarbon with dichloromethylsilane. For example, reaction of 1,5-hexadiene with dichloromethylsilane yields tetrachloro-2,9-disiladecane:

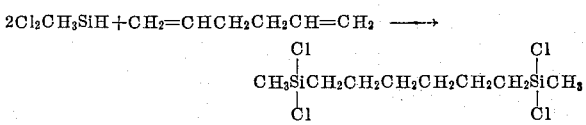

Reaction of the above tetrachloro compound with an appropriate Grignard reagent, e.g., an aromatic bromohydrocarbonmagnesium, results in replacement of one or more of the chlorine atoms, depending upon the quantity of said Grignard reagent, by an aromatic hydrocarbon radical.

Other tetrahalodisilaalkanes which are useful for preparation of the present aryl disilaalkanes are generally those in which there are present in the alkane chain joining the two silicon atoms from 5 to 8 methylenic radicals. Thus by employing the 2,2,8,8-tetrabromo-2,8-disilanonane which is obtained from dibromomethylsilane and 1,4-pentadiene, there are prepared by reaction with an appropriate Grignard reagent compounds having at least one aryl or aryloxyaryl substituent at the silicon atom of the disilanonane. Similarly useful are the 2,2,10,10-tetrahaloundecanes which are obtained by reaction of a dihalomethylsilane and 1,6-heptadiene, or the 2,2,11,11-tetrahalododecanes which are obtained by reaction of a dihalomethylsilane, e.g., dichloro-, dibromo-, or diiodo-methylsilane and 1,7-octadiene. It will be noted that all of the presently useful tetrahalodisilaalkanes possess a methyl radical attached to the silicon. For preparing aryl disilaalkanes having optimum oxidative stability we have found that any aliphatic group other than the alkylene chain should be limited to methyl. Hence the use of tetrahalodisilaalkanes having a methyl radical attached to the halo-bearing silicon atom is a convenient means of preparing the presently provided aryl disilaalkanes. But if desired, the starting tetrahalo compound may be one which already contains an aryl group attached to the silicon, e.g., it may have the structure

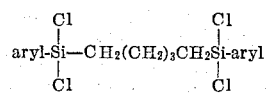

In that case the required methyl radical can be introduced by reaction with halomethylmagnesium. The present aryl-substituted disilaalkanes may also be prepared by reaction of Grignard reagents with an $\alpha,\alpha,\alpha,\omega,\omega,\omega$-hexahalodisilaalkane, employing a halomethylmagnesium as one of the reagents in a quantity sufficient to replace from 2 to 4 of the halogens by methyl. The starting hexahalodisilaalkanes are readily available by reaction of a diolefin with trihalosilane. The present aromatic disilaalkane functional fluids must contain at least one aromatic substituent at each silicon atom. The Grignard reagents which are used to introduce aromatic substitution by replacement of halogen from the halodisilaalkane are haloarylmagnesiums or halo(aryloxyaryl)magnesiums such as iodophenylmagnesium, bromo-(o-, m- or p-tolyl)magnesium, bromo-(o-, m- or p-tert-butylphenyl)magnesium, fluoro-(2,3-, 3,4-, or 2,5-dimethylphenyl)magnesium, bromo-(o-, m- or p-cyclohexylphenyl)magnesium, chloro(hexylphenyl)-magnesium, bromo-(o-, m- or p-biphenylyl)magnesium, bromo-(o-, m- or p-phenoxyphenyl)magnesium, bromo-p-(o- or m-tolyloxy-o- or m-tolyl)magnesium, bromo-p-(p-biphenylyloxybiphenylyl)-magnesium bromide, etc.

Examples of aryl-substituted disilaalkanes provided by the invention are shown in the table below:

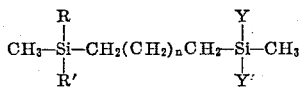

| R= | R'= | n= | Y= | Y'= |
|---|---|---|---|---|
| CH₃ | C₆H₅ | 3 | C₆H₅ | C₆H₅ |
| CH₃ | p-C₆H₅OC₆H₄ | 4 | CH₃ | p-C₆H₅OC₆H₄ |
| CH₃ | C₆H₅ | 3 | CH₃ | p-C₆H₅OC₆H₄ |
| CH₃ | p-CH₃C₆H₄ | 4 | C₆H₅ | p-CH₃C₆H₄ |
| CH₃ | p-(CH₃)₃C.C₆H₄ | 4 | C₆H₅ | p-(CH₃)₃C.C₆H₄ |
| CH₃ | m-CH₃(CH₂)₅C₆H₄ | 5 | CH₃ | m-CH₃(CH₂)₅C₆H₄ |
| CH₃ | m-C₆H₅OC₆H₄ | 4 | CH₃ | m-C₆H₅OC₆H₄ |
| C₆H₅ | C₆H₅ | 6 | C₆H₅ | C₆H₅ |
| CH₃ | C₆H₅—C₆H₄— | 6 | CH₃ | C₆H₅—C₆H₄ |
| C₆H₅ | C₆H₅ | 4 | C₆H₅ | C₆H₅ |
| CH₃ | m-C₆H₄OC₆H₄ | 4 | CH₃ | C₆H₅ |
| CH₃ | m-(m-CH₃C₆H₄OC₆H₄) | 6 | CH₃ | m-(m-CH₃C₆H₄OC₆H₄) |
| CH₃ | C₆H₅ | 4 | (CH₃)₃C.C₆H₄ | p-C₆H₅ |

Compounds of the above formula, where the total number of carbon atoms in the R, R', Y and Y' is less than 14 are unsuitable for use as functional fluids owing to their low boiling points. Those compounds of the above formula in which the total number of carbon atoms in R, R', Y and Y' is greater than 28 tend to be high melting solids rather than fluids. Compounds in which hydrogen, rather than the methyl group or the aryl or aryloxyaryl group is attached to silicon are generally unstable to moisture. Within the above-stated limits of the R, R', Y and Y' substitutents, the variation in chain length of the bridging alkylene —CH₂(CH₂)ₙCH₂— is unimportant, so long as the value of $n$ is not less than 3 and not greater than 6. Since 1,5-hexadiene is readily available, the starting tetrahaloalkane is advantageously a 2,2,9,9-tetrahalo-2,9-disiladecane. For optimum thermal and oxidative stability, the alkylene radical contains no tertiary hydrogens.

Particularly valuable as functional fluids are compounds having two methyls and one hydrocarbon monocyclic aryl at each of the silicon atoms. Such compounds have the formula

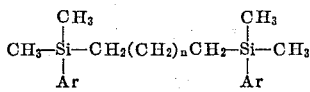

wherein Ar is monocyclic hydrocarbon aryl which is free of olefinic and acetylenic unsaturation, contains from 6 to 12 carbon atoms and is linked to silicon through aromatic, nuclear carbon, and $n$ is a number of 3 to 6. Examples thereof are 2,8-dimethyl-2,8-diphenyl-2,8-disilanonane, 2,9-dimethyl-2,9-di-p-tolyl-2,9-disiladecane, 2,9-dimethyl-2,9-bis(o-, m- or p-cyclohexylphenyl)-2,9-disiladecane, 2,9-dimethyl-2,9-bis(m-tert-butylphenyl)-2,9-disiladecane, 2,9-dimethyl-2,9-bis(o-, m- or p-biphenylyl)-2,9-disiladecane, 2,10-dimethyl-2,10-bis(2,3 or 3,4-dimethylphenyl) - 2,10 - disilaundecane, 2,10 - dimethyl - 2,10-diphenyl-2,10-disilaundecane, 2,10-dimethyl-2,10-bis[o-, m- or p - (1 - methylcyclopentyl)phenyl] - 2,10 - disilaundecane, 2,11 - dimethyl - 2,11 - diphenyl - 2,11 - disiladodecane, 2,11-dimethyl-2,11-bis(o-, m- or p-biphenylyl)-2,11-disiladodecane, etc.

Those of the present compounds which have an aryloxyaryl, instead of an aryl substituent, at at least one of the silicon atoms are of interest owing to the viscosity characteristics of the products. Such compounds have the following formula with two such groups

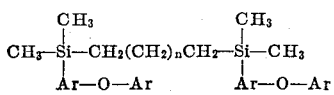

wherein Ar and $n$ are as defined above.

Owing to the effect on fluid properties, such aryl group cannot be so large as to give a total of more than 26 carbon atoms in the two Ar-O-Ar substituents. Examples of the presently provided compounds of the above formula are 2,8-dimethyl-2,8-bis(o-, m- or p-phenoxyphenyl)-2,8-(disilanonane, 2,9-dimethyl-2,9-bis(o-, m- or p-phenoxyphenyl)-2,9-disiladecane, 2,10-dimethyl-2,10-bis[p-(m-tolyloxy)phenyl]-2,10-disilaundecane, etc.

Compounds having one hydrocarbon monocyclic aryl radical at one silicon atom and one aryloxyaryl group at the other silicon atom, with the remaining silicon valences being satisfied with methyl radicals are frequently desirable because in them there appears to be blended the good thermal and oxidative stability of the aromatic hydrocarbon substituent and the good viscosity characteristics conferred by the aliphatic portion of the molecule. Such compounds have the formula

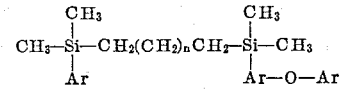

wherein Ar and $n$ are as defined above. Examples of such compounds are 2,8-dimethyl-2-phenyl-8-(p-phenoxyphenyl) - 8 - phenyl - 2,8 - disilanonane, 2,9 - dimethyl - 2-(o-, m- or p-tolyl)-9-(m-phenoxyphenyl)-2,9-disiladecane, 2,9 - dimethyl - 2 - (p - cyclohexylphenyl) - 9 - (m - phenoxyphenyl)-2,9-disiladecane, 2,10-dimethyl-2-phenyl-9-[p - (2 - tert - butylphenoxy)phenyl] - 2,10 - disilaundecane, 2,11 - dimethyl - 2 p - tolyl - 9 - (m - phenoxyphenyl)-2,11-disilaundecane, etc.

Reaction of the halohydrocarbonmagnesium with the halodisilaalkanes to give the presently provided aromatic disilaalkanes may be conducted at ordinary decreased or increased temperature and in the presence of an inert liquid diluent or solvent. Generally, the halohydrocarbonmagnesium compound, i.e., the Grignard reagent, is present in the solvent in which it was prepared, e.g., by treating the methyl or aryl or aryloxyaryl halide with magnesium in ether. To the solution of Grignard reagent there is then added the halodisilaalkane. Generally, the reaction is exothermic and application of heat is not necessary. The halodisilaalkane is simply contacted with the Grignard solution, and the resulting mixture may be stirred until reaction is completed. However, in some instances, reaction time may be shortened by external heating. Temperatures of from, say, 30° C. to refluxing may be advantageously employed for this purpose. Generally, temperatures of from, say, 10° C. to 120° C. are useful. Besides ethyl ether, useful diluents or solvents include, e.g., butyl ether, diglyme, tetrahydrofuran, hexane, etc.

Since the aromatic disilaalkanes are formed through replacement of the silicon-halogen by an aryl or aryloxyaryl radical or by one or both of such radicals and the methyl radical, the reactants are employed in a ratio which is calculated to replace the desired number of halogens by the particular halohydrocarbon magnesium which is employed. The reactants are thus advantageously employed in stoichiometric proportions.

All of the reaction conditions, i.e., temperature, reactant proportions, reaction time, nature of the diluent, etc., can be readily arrived at by easy experimentation. Progress of the reaction can be followed by noting the formation of by-product magnesium halide and change in viscosity and/or by sampling the reaction mixture at intervals and determining the content of the desired product, e.g., by nuclear magnetic resonance analysis.

The presently provided aromatic disilaalkanes are stable, well-characterized materials which are generally useful as functional fluids, since they are generally liquid over wide temperature ranges, possess high flash points and high ignition points and are characterized by very good resistance to heat, oxygen, and moisture. The thermal decomposition point of 2,9-dimethyl-2,9-diphenyl-2,9-disiladecane, for example, is 626° F. They remain liquid at temperatures which may be below −70° F., and substantially higher than 600° F. Hence they are eminently suited for use as hydraulic fluids, especially in hydraulic systems which are subjected to widely varying temperature conditions. The presently provided aromatic disilaalkanes possess good viscosity/temperature relationships, and are also useful, e.g., as heat-exchange media, gyro fluids and lubricants. Their very good oxidative stability makes them particularly valuable for use as lubricants and in other applications wherein exposure to air at high temperatures is encountered. They may be admixed, however, with additives conferring even higher stability and with adjuvants commonly used in the functional fluid art, e.g., extreme pressure-resisting additives, anti-corrosive agents, viscosity-index improvers, etc.

The invention is further illustrated by, but not limited to, the following examples:

Example 1

Tetrachlorodisiladecane was prepared as follows: A mixture consisting of 21.2 g. (0.258 mole) of 1,5-hexadiene and 123.5 g. of dichloromethylsilane was cooled to 15° C., and a few drops of a dilute solution of $H_2PtCl_6$ catalyst in ethyl acetate was added. There was no reaction. Accordingly, the mixture was heated to 30° C. and more catalyst was added. An exothermic reaction was evidenced, and ice-cooling was used until vigorous reaction had ceased. Upon discontinuing the cooling, the temperature of the reaction mixture rose to 47° C. within a 15-minute period. Reaction continued, as evidenced by the elevated temperature, for about one hour. Then heat was applied to raise the temperature to reflux (55° C.) and heating at reflux was continued for about two hours. Distillation of the resulting reaction mixture gave 2,2,9,9 tetrachloro-2,9-disiladecane, B.P. 155° C./15 mm., $n_D^{25}$ 1.4655.

An ether solution of the Grignard reagent, phenylmagnesium bromide, was prepared by adding an ether solution of 20.3 g. (0.18 mole) of bromobenzene to 4.4 g. of magnesuim in ether over about a 3-hour period, and then stirring the reaction mixture for 3 hours. To the resulting solution of bromophenylmagnesium, there was then added 25 g. (0.08 mole, calculated to replace two chlorines) of the above prepared 2,2,9,9-tetrachlorodisiladecane, and the whole was stirred at ambient temperature for about 40 hours. Bromomethylmagnesium (80 ml. of an approximately 3-molar solution in ether) was then added to replace the residual chlorine, since the quantity of bromophenylmagnesium which had been used was sufficient only to replace two chlorine atoms of the tetrachlorodisiladecane. The resulting reaction mixture was then stirred overnight, hydrolyzed by treatment with aqueous ammonium chloride, and filtered. The filtrate was extrated with ether and the ether extract was distilled and filtered through attapulgus clay to give the substantially pure 2,9-dimethyl-2,9-diphenyl-2,9-disiladecane, B.P. 152° C./0.08 mm., $n_D^{25}$ 1.5236, and showing the following nuclear magnetic resonance chemical shifts, using tetramethylsilane as reference:

| Chemical Shift (p.p.m.) | Relative Area | Assignment |
| --- | --- | --- |
| 7.6–7.1 (multiplet) | 2.5 | Aromatic protons |
| 1.3 (broad) | 2.0 | —CH$_2$— |
| 0.73 (broad multiplet) | 1.0 | Si—(CH$_2$)—C |
| 0.22 (single) | 3.0 | (Si)—CH$_3$ |

Infrared analysis of the compound confirmed the structure.

Example 2

To a mixture consisting of 58 g. (0.695 mole) of freshly distilled 1,5-hexadiene and 229 g. (2.0 mole) of dichloromethylsilane which had been cooled to 15° C., there was added one drop of a butanol solution of $H_2PtCl_6$ catalyst. The temperature of the mixture rose to 22° C. within about 3 minutes, and ice-bath cooling was applied for a few minutes. The temperature of the mixture was then allowed to rise to 39° C. At this point, since no refluxing was evident, a second drop of the same catalyst solution was added. During approximately the next 40 minutes, the temperature rose to 53° C., and slow refluxing was noted. Since the temperature remained the same for about 15 minutes, gentle heat was applied to maintain reflux (55–60° C.) and refluxing was then continued for about four hours. Distillation of the resulting reaction mixture gave 161.8 g. (74.5% theoretical yield) of the substantially pure 2,2,9,9-tetrachloro-2,9-disiladecane.

An ether solution of bromophenylmagnesium was prepared by reacting 110 g. (0.7 mole) of bromobenzene with 17 g. (0.7 atom) of magnesium in ether. To the resulting solution of the bromophenylmagnesium there was then added 100 g. (0.32 mole) of the above-prepared 2,2,9,9-tetrachloro-2,9-disiladecane and the whole was stirred overnight at about 40° C. At the end of that time a portion of the ether was stripped off in order to raise the reflux temperature to 50° C. and refluxing at about this temperature was continued for several hours while an ether solution of bromoethylmagnesium was prepared from 96 g. of methyl bromide and 24 g. of magnesium. The ether solution was then added to the first reaction mixture, which now comprised the partial halogen-replacement product of the tetrachlorodisiladecane, i.e., 2,9-dichloro-2,9-diphenyl-2,9-disiladecane. The resulting mixture was refluxed for 3 hours and then allowed to stand overnight at room temperature. After hydrolyzing with aqueous ammonium chloride, washing and filtering, the filtrate was distilled to give 94.4 g. (83% theoretical yield) of the substantially pure 2,9-dimethyl-2,9-diphenyl-2,9 - disiladecane, B.P. 160–164° C./1–0.2 mm. Redistillation at 0.1 mm. gave 92.6 g. of the purer product, B.P. 158/0.1 mm. $n_D^{25}$ 1.5233, $d_4^{25}$ 0.9304.

Example 3

An ether solution of bromo(p-phenoxyphenyl)-magnesium was prepared by reacting 50 g. (0.2 mole) of p-bromophenyl phenyl ether with 4.9 g. (0.2 atom) of magnesium. To this solution there was added 55 g. (0.176 mole) of the 2,2,9,9-tetrachloro-2,9-disiladecane of Example 1. The whole was thoroughly stirred and there was then added to the stirred mixture 100 ml. of a 1.76 N ether solution of bromophenylmagnesium (calculated to contain 0.176 mole of bromophenylmagnesium). The resulting mixture was stirred overnight; and at the end of that time there was added to said mixture an ether solution of bromomethylmagnesium which had been prepared by the reaction of 58 g. of methyl bromide with 12.4 g. of magnesium in ether. After stirring for 2 hours, the reaction mixture was hydrolyzed (aqueous ammonium chloride), washed and filtered. Distillation of the filtrate gave the substantially pure 2,9-dimethyl-2-(4-phenoxyphenyl)-9-phenyl-2,9-disiladecane, B.P. 208–215° C./0.1 mm., $n_D^{25}$ 1.5499, a clear viscous liquid.

The compound was found to show the following nuclear magnetic resonance chemical shifts, using tetramethylsilane as reference:

| Chemical Shift (p.p..m.) | Relative Area | Assignment |
|---|---|---|
| 7.7–6.9 (multiplet) | 4.4 | Aromatic proton |
| 1.30 (broad) | 3.9 | —CH$_2$— |
| 1.75 (broad) | 3.9 | Si—(CH$_2$)—C |
| 0.22 (single) | 3.7 | Si—(CH$_3$) |

Example 4

The 2,9-dimethyl-2-(4-phenoxyphenyl)-9-phenyl-2,9-disiladecane of Example 3 was evaluated for use as hydraulic fluid by determining its decomposition point, vapor pressure, pour point, and kinematic viscosity. The following results were obtained:

The decomposition temperature, as determined with the isoteniscope, was found to be 667° F. (353° C.). The decomposition temperature is herein defined as the temperature at which $dp/dt$ (rate of pressure rise) due to decomposition of the sample is 0.014 mm. Hg/sec.

Temperatures for vapor pressure equal to certain pressures of mercury were determined to be as follows:

| Temp., ° C.: | Mm. Hg |
|---|---|
| 278 | 10. |
| 356 | 100. |
| 446 | 760 extrapolated. |

The compound was found to have a pour point of minus 30° F. as determined by ASTM procedure D 97–57.

Kinematic viscosity determination by ASTM procedure D 445-T 1960 gave the following values.

| ° F.: | Centistokes |
|---|---|
| 0 | 4,970 |
| 100 | 31.09 |
| 210 | 5.145 |

Example 5

2,9-dimethyl-2,9-diphenyl-2,9-disiladecane was evaluated as hydraulic fluid, having efficacy over a long temperature range, by determining its decomposition temperature, pour point, viscosity, vapor pressure and oxidative stability. The following results were obtained:

The decomposition temperature, as determined with the isoteniscope, was found to be 626° F. (330° C.). The decomposition temperature is here defined as the temperature at which $dp/dt$ (rate of pressure rise) due to decomposition of the sample is 0.014 mm. Hg./sec.

The pour point of the compound, as determined by American Society for Testing Materials procedure D 97–57, was found to be below minus 70° F.

Temperatures for vapor pressure equal to certain pressures of mercury were determined to be as follows:

| Temp., ° F.: | Mm. Hg |
|---|---|
| 412 | 10 |
| 563 | 100 |
| 716 | 760 |

Determination of the kinematic viscosity, using ASTM D 445–T 1960 procedure, gave the following results:

| ° F.: | Centistokes |
|---|---|
| −65 | 26,440 |
| −30 | 981 |
| 0 | 169.1 |
| 100 | 9.127 |
| 210 | 2.531 |

Testing of the oxidative stability of the compound was conducted by passing 20 liters/hour of air for 24 hours into a 20 ml. sample of the compound at 450° F., and then determining the change in viscosity. A 42.4% change in viscosity at 210° F. and 61.7% at 100° F. was thus observed.

From the above data it is evident that the compound is a hydraulic fluid which, in the absence of any additive, is suitable for use at either extremely high or extremely low temperature.

Example 6

This example shows the adjuvant effect of the present aromatic disilaalkanes on the viscosity of polyphenyl ether functional fluid, e.g., such as that described in the Diamond Patent No. 2,940,929, the Blake et al. Patent No. 3,080,321, the Barnum et al. Patent No. 3,006,852 and the article appearing at pages 64–65 of Chemical Engineering News, April 13, 1959. The aforesaid polyphenyl ethers can be obtained by the Ullman ether synthesis, e.g., an alkali metal phenoxide such as potassium or sodium phenate or phenoxyphenate is reacted with an aromatic halide such as bromobenzene or bromophenyl phenyl ether in the presence of a copper catalyst.

Forty-seven parts by weight of the 2,9-dimethyl-2,9-diphenyl-2,9-disiladecane of Example 2 was admixed with fifty-three parts by weight of a mixture of polyphenyl ethers consisting of a predominant quantity of a 5-ring polyphenyl ether having only meta-linkages with the balance being 3- to 5-ring polyphenyl ethers having both meta and para linkages. The resulting product, i.e., the mixture of said disiladecane and said polyphenyl ether mixture was found to have the following kinematic viscosity as determined by ASTM procedure D 445–T 1960:

| ° F.: | Centistokes |
|---|---|
| 0 | 9,127 |
| 100 | 34.05 |
| 210 | 5.017 |

The viscosity at 0° F. indicates the pour properties of a fluid at low temperatures. That substantial improvement in this respect was attained by addition of the disilaalkane to the polyphenyl ether mixture is evident from the fact that by the same testing procedure the kinematic viscosity of said polyphenyl ether mixture in absence of any additive was found to be as follows:

| ° F.: | Centistokes |
|---|---|
| 0 | Too viscous to flow. |
| 100 | 355.4. |
| 210 | 13.06. |

The presently provided aromatic disilaalkanes may be used alone as functional fluids or they may be employed with other compositions having functional fluid characteristics, e.g., the polyphenyl ethers as shown in the above example, the polyester fluids, the polyalkylene glycols, hydrocarbon lubricants, etc. Since addition of even small amounts of said aromatic disilaalkanes has a beneficial effect on such other fluids, they may be admixed in any proportion. However, advantageously the functional fluid mixture will contain at least a beneficial quantity, say, an amount of at least 10% by weight of the fluid.

It is to be understood that the foregoing detailed description is merely given by way of illustration. It is obvious that many variations may be made therein without departing from the spirit and scope of the invention as defined in the appended claims.

What I claim is:
1. The compound for the formula

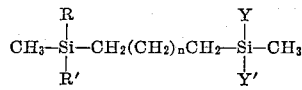

wherein R and Y are selected from the class consisting of methyl and hydrocarbon monocyclic aryl which is free of olefinic and acetylenic unsaturation, contains from 6 to 12 carbon atoms, and is linked to the silicon through aromatic nuclear carbon, and R′ and Y′ are selected from the class consisting of aryl and aryloxyaryl, wherein aryl is hydrocarbon and monocyclic, is free of olefinic and acetylenic unsaturation, contains from 6 to 12 carbon atoms and is linked to the silicon through aromatic nuclear carbon, and wherein the sum of the total number of carbon atoms in R, R′, Y and Y′ is from 14 to 28 and $n$ is a number of from 3 to 6.

2. The compound of the formula

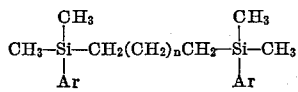

wherein Ar is monocyclic hydrocarbon aryl which is free of olefinic and acetylenic unsaturation, contains from 6 to 12 carbon atoms and is linked to silicon through aromatic nuclear carbon, and $n$ is a number of 3 to 6.

3. The compound of the formula

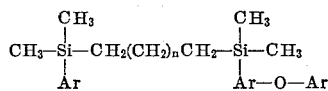

wherein Ar is monocyclic hydrocarbon aryl which is free of olefinic and acetylenic unsaturation, contains from 6 to 12 carbon atoms and is linked to silicon through aromatic nuclear carbon, and $n$ is a number of 3 to 6.

4. 2,9-dimethyl-2,9-diphenyl-2,9-disiladecane.

5. 2,9-dimethyl-2-(4-phenoxyphenyl)-9-phenyl-2,9-disiladecane.

6. A hydraulic system containing as the operative fluid the compound defined in claim 1.

7. A hydraulic system containing as the operative fluid the compound defined in claim 2.

8. A hydraulic system containing as the operative fluid the compound defined in claim 3.

9. A hydraulic system containing as the operative fluid the compound defined in claim 4.

10. A hydraulic system containing as the operative fluid the compound defined in claim 5.

11. The method of operating a fluid hydraulic system which comprises transmitting power in said system by the use of the compound of claim 1 as the operative fluid.

12. The method of operating a fluid hydraulic system which comprises transmitting power in said system by the use of the compound of claim 2 as the operative fluid.

13. The method of operating a fluid hydraulic system which comprises transmitting power in said system by the use of the compound of claim 3 as the operative fluid.

14. The method of operating a fluid hydraulic system which comprises transmitting power in said system by the use of the compound of claim 4 as the operative fluid.

References Cited by the Examiner

UNITED STATES PATENTS

| | | | |
|---|---|---|---|
| 2,507,513 | 5/1950 | Goodwin | 260—448.2 |
| 2,507,518 | 5/1950 | Goodwin | 260—448.2 |
| 2,544,079 | 3/1951 | Goodwin | 260—448.2 |
| 2,557,942 | 6/1951 | Clark | 260—448.2 |
| 2,828,279 | 3/1958 | Lewis | 260—448.2 |
| 2,924,574 | 2/1960 | Kaufman | 252—78 |
| 3,019,191 | 1/1962 | Furby et al. | 252—78 |

TOBIAS E. LEVOW, *Primary Examiner.*

SAMUEL H. BLECH, HELEN M. McCARTHY,
*Examiners.*

P. F. SHAVER, *Assistant Examiner.*